United States Patent [19]

Szilagyi et al.

[11] 4,016,427
[45] Apr. 5, 1977

[54] APPARATUS FOR PRODUCING EFFICIENT SECOND HARMONIC GENERATION AND FREQUENCY MIXING

[75] Inventors: Andrei Szilagyi, Cambridge; Audun Hordvik, Nagog Woods; Howard Roy Schlossberg, Lexington, all of Mass.

[73] Assignee: The United States of America as represented by the Secretary of the Air Force, Washington, D.C.

[22] Filed: Jan. 21, 1976

[21] Appl. No.: 650,840

[52] U.S. Cl. .................... 307/88.3; 321/69 R
[51] Int. Cl.² ............................. H02M 5/04
[58] Field of Search .............. 307/88.3; 321/69 R

[56] References Cited
UNITED STATES PATENTS

| | | | |
|---|---|---|---|
| 3,384,433 | 5/1968 | Bloembergen | 307/88.3 UX |
| 3,407,309 | 10/1968 | Miller | 307/88.3 |
| 3,842,289 | 10/1974 | Yariv et al. | 307/88.3 |

*Primary Examiner*—Siegfried H. Grimm
*Assistant Examiner*—Darwin R. Hostetter
*Attorney, Agent, or Firm*—Joseph E. Rusz; Jacob N. Erlich

[57] ABSTRACT

An apparatus for producing efficient second harmonic generation and frequency mixing having at least one crystal slice of predetermined thickness and preselected orientation mounted in optical alignment with an incoming laser beam. The proper orientation of the crystal slice together with the choice of laser polarization leads to efficient non-linear optical coupling with low reflection losses.

15 Claims, 3 Drawing Figures

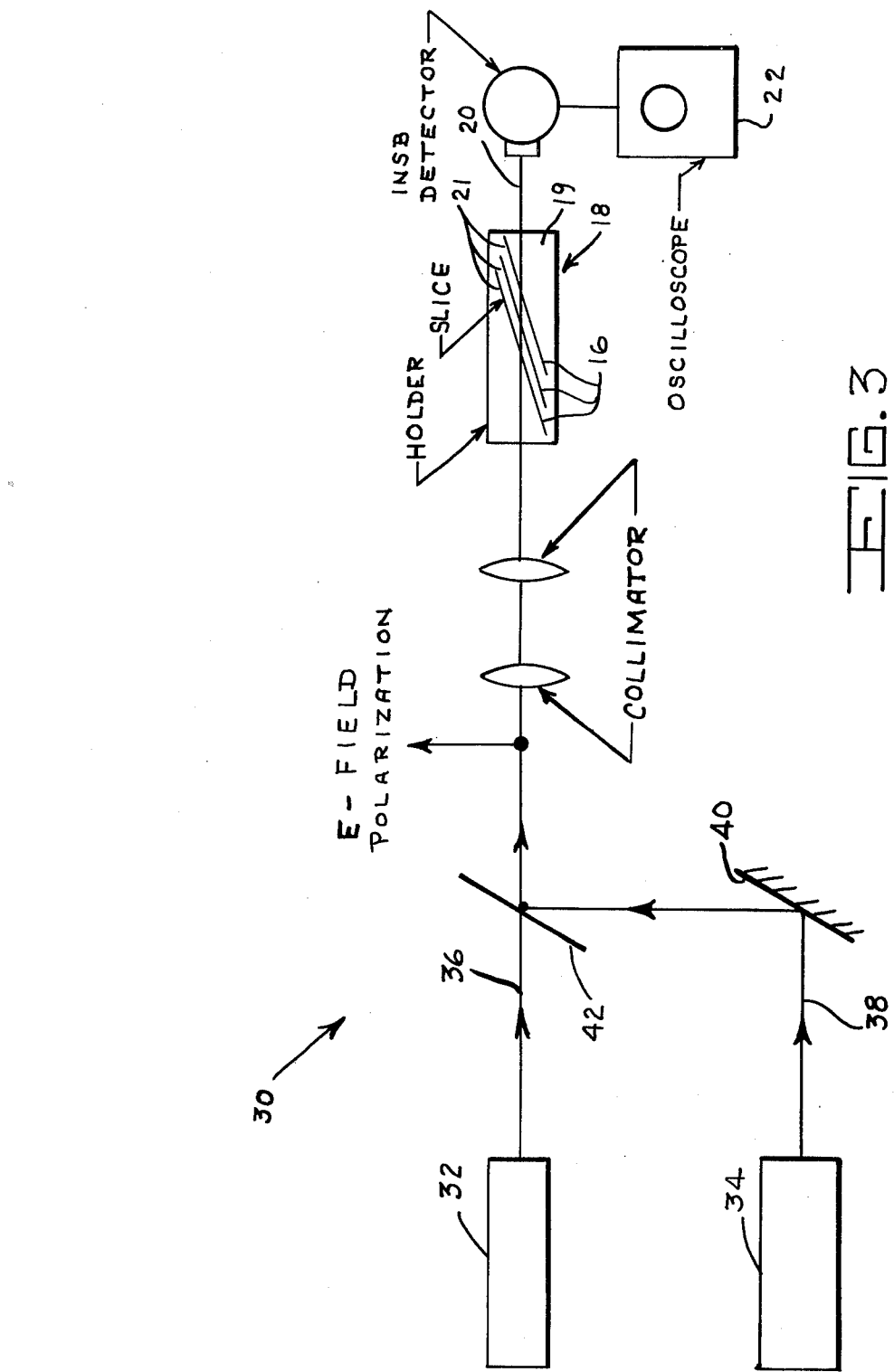

APPARATUS FOR PRODUCING EFFICIENT SECOND HARMONIC GENERATION AND FREQUENCY MIXING

STATEMENT OF GOVERNMENT INTEREST

The invention described herein may be manufactured and used by or for the Government for governmental purposes without the payment of any royalty thereon.

BACKGROUND OF THE INVENTION

The invention relates generally to second harmonic generation and frequency mixing, and, more particularly to an efficient non-linear optical coupling system capable of second harmonic generation and frequency mixing wthout deleterious reflection losses.

Great need has arisen in areas of IR radar and induced chemical reactions, for example, to efficiently convert infrared wavelengths to those values necessary for effective operation of these systems. Since lasers generally have fixed or discrete frequencies there are many wavelengths regions where there are no acceptable laser sources available. To overcome this problem a variety of techniques have been utilized.

The most common technique is to utilize the optical non-linearity exhibited by non-centrosymmetric crystals for second harmonic generation, frequency mixing and optical parametric generation. For efficient conversion the generated polarization and electromagnetic wave must propagate in phase, but due to dispersion, radiation at different frequencies will normally propagate at different phase velocities. The most commonly used technique to overcome this problem exploits the double refraction exhibited by certain crystals. Certain asymmetric crystals such as calcite are doubly refracting because in them light can travel at two different velocities, described as ordinary and extraordinary. These velocities actually vary with propagation direction and polarization as well as with wavelength. For instance, in potassium dihydrogen phosphate (KDP), a piezoelectric crystal commonly used for harmonic generation ordinary fundamental light at 6,934 angstroms at an angle of 50° to the optic axis of the crystal travels at exactly the same velocity as extraordinary harmonic light at 3,471.5 angstroms. When this direction is used for harmonic generation, the retardation of the ultraviolet harmonic light due to dispersion is precisely compensated by the higher velocity of extraordinary light at the harmonic wavelength. This technique has made possible an increase in coherence length from a thousandth of a centimeter to more than a centimeter.

Another technique of avoiding the interference problem is applicable in ferroelectric crystals such as barium titanate. Ferroelectric crystals can be obtained in the form of a multilayered sandwich in which the layers are regions, called domains, that have different properties. In barium titanate adjoining domains are completely equivalent except that one is inverted with respect to the other. The phase of the harmonics generated in successive domains is reversed, with the result that the interference effect is particularly offset and harmonic generation greatly enhanced.

The systems of the past, however, still leave much to be desired since these processes of generating new wavelengths utilize birefringent crystals. Unfortunately crystals which have the highest non-linearity and thus have the potential for producing the highest output power are non birefringent. In addition, in the 5–10 $\mu$ region no acceptable crystals are available, in that they are either difficult to make or are of poor optical quality.

The problem therefore arises on how to effectively utilize non-birefringent crystals which are more easily manufactured and are generally of good optical quality in second harmonic generation and frequency mixing.

SUMMARY OF THE INVENTION

The instant invention overcomes the problems set forth hereinabove by providing a technique which practically and efficiently produces "quasi phase matching" in non-birefringent crystals. In order to reduce refraction losses and to gain maximum possible efficiency, a crystal plate or slice utilized with this invention must be oriented in a preselected manner and be of a predetermined thickness. In the instant invention the orientation of the crystal slice together with the choice of laser polarization leads to efficient non-linear optical coupling with low reflection losses.

In this invention, the orientation of the crystal axis is chosen such that the component of the nonlinear polarization $P_{11}$ parallel to the electric field is a maximum or $P_{11} = \vec{P} \cdot \hat{E} = $ a maximum when the laser beam is incident on the crystal at Brewster's angle.

Once crystal slices of the specified orientation and thickness are obtained, the sign of the effective non-linear susceptibility for alternating slices can be changed by rotating the slices 180° about a line perpendicular to the plane of incidence with respect to their original position within the crystal. It should be noted that this inventive technique is also acceptable for sum and difference frequency generation as well as second harmonic generation.

It is therefore an object of this invention to provide an apparatus which allows for the arrangement of plates or slices of non-linear optical material in which efficient quasi-phase matched second harmonic generation and frequency mixing can be achieved without deleterious reflection mixing.

It is another object of this invention to provide an apparatus for producing efficient second harmonic generation and frequency mixing, the apparatus being economical to produce and utilizes in its construction conventional, currently available components.

For a better understanding of the present invention together with other and further objects thereof reference is made to the following description taken in conjunction with the accompanying drawing and its scope will be pointed out in the appended claims.

DESCRIPTION OF THE DRAWING

FIG. 3 is a schematic representation of the apparatus of this invention for efficiently producing frequency mixing.

DETAILED DESCRIPTION OF THE PREFERRED EMBODIMENT

Figure 1:
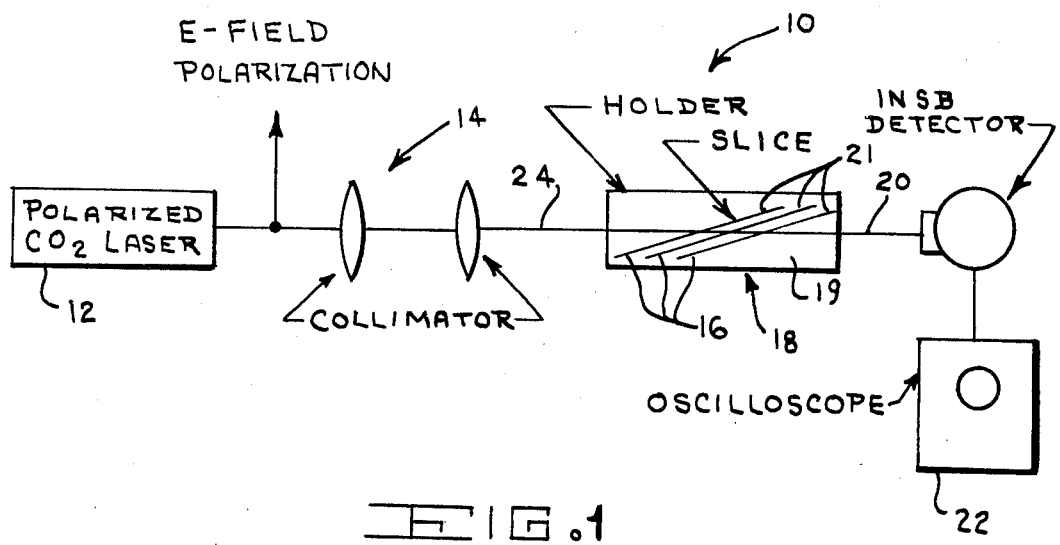
FIG. 1 is a schematic representation of the apparatus of this invention for efficiently producing second harmonic generation.

Reference is now made to FIG. 1 of the drawing which best shows the apparatus 10 of this invention which is capable of efficiently producing second harmonic generation. A polarized laser source 12 such as $CO_2$ laser provides a laser beam which passes through any suitable collimator 14 and onto a plurality of crystal slices 16 of predetermined thickness which are held in proper orientation by any suitable mounting arrangement 18. The details of mounting arrangement 18 are not shown since mounting arrangement 18 may take on any suitable construction such as a holder 19 having slots 21 therein capable of fixedly positioning crystal plates or slices 16 therein in their proper or preselected orientation.

The thickness, $t$, of crystal slices 16 for second harmonic generation should meet the requirement that:

$$t = \lambda/4\Delta\eta(m)$$

wherein $m$ = an odd integer, $\lambda$ is the wavelength of the incident radiation and $\Delta\eta = \eta(2\omega) - \eta(\omega)$ where $\eta(\omega)$ is the index of refraction of the incident radiation and $\eta(2\omega)$ is the index of refraction of the second harmonic generated radiation. If desired the output beam 20 generated by apparatus 10 may be received by any suitable detector 22 such as an InSb detector and from there passed on to an oscilloscope 22.

Although one form of the desired apparatus 10 is shown in FIG. 1, it is the specific orientation of crystal slices 16 that form an important part of this invention. For a proper understanding of the orientation of crystal slices 16, reference is now made to FIG. 2 of the drawing. For purposes of clarity, an example of proper crystal orientation will be explained utilizing a non-birefringent crystal slice such as GaAs, a crystal which is relatively easy to manufacture and has good optical quality, but which in the past has been useless in providing second harmonic generation.

The example set forth hereinbelow provides second harmonic generation in a GaAs crystal slice 16 at the 10.6 $\mu$m line of the $CO_2$ laser 12. The non-linear polarization P for GaAs crystal 16 is given by:

$$\vec{P} = E^2 d_{123}(2\hat{E}_2\hat{E}_3, 2\hat{E}_1\hat{E}_3, 2\hat{E}_1\hat{E}_2)$$

Figure 2:
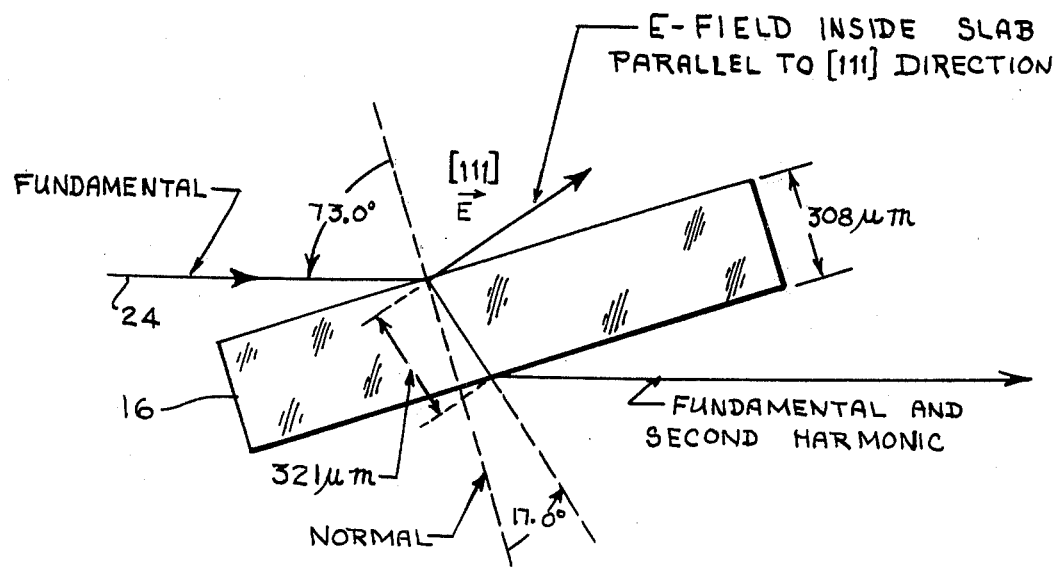
FIG. 2 is a schematic representation of the GaAs crystal slice of this invention for producing second harmonic generation.

In the instant invention, it is essential that at the Brewster angle $P_{11}$, the component of the non-linear polarization parallel to the electric field of the laser beam 24, be maximum, or $$P_{11} = \vec{P} \cdot \hat{E} = 6E^2 d_{123} \hat{E}_1\hat{E}_2\hat{E}_3$$

and as set forth above $\vec{P}$ = the non-linear polarization at twice the incident frequency and $\hat{E}$ = a unit vector along the component in the plane of incidence of the electric field of said laser beam 24. This expression is a maxmimum when $$\hat{E}_1 = \hat{E}_2 = \hat{E}_3 = \frac{1}{\sqrt{3}},$$

in other words the electric field of the fundamental beam 24 is along the [1 1 1] axis of crystal 16. Taking into account the value of the Brewster angle in GaAs at 10.6 $\mu$m and the fact that the effective path length inside crystal 16 must be an odd multiple of the coherence length (which at 10.6 $\mu$m is equal to about 107 $\mu$m in GaAs), the recommended configuration is as shown in FIG. 2 of the drawing. Once crystal slices 16 of the specified orientation and thickness are obtained, the sign of the effective nonlinear susceptibility $d_{123}$ for successive slices 16 can be changed by rotating alternate slices 180° about a line perpendicular to the plane of incidence. As shown in FIG. 1 they are then arranged in a holder 18 formed of a block of metal with slots 21 cut at the appropriate angle. The slices 16 are inserted therein such that most of their area is exposed to beam 24.

The same general configuration of the apparatus 10 of this invention for producing second harmonic generation can also be used as shown by apparatus 30 in FIG. 3 for sum and difference frequency generation, the only difference being the utilization of a pair of input sources 32 and 34, respectively. One of these sources 32 is in the form of any suitable laser while source 34 may be any suitable optical source such as a laser or the like. Each source 32 and 34 produces a beam 36 and 38, respectively. Beams 36 and 38 are combined, that is, made colinear by means of a totally reflective mirror 40 and a dichroic mirror 42 before passing through any suitable collimator 14 and onto the crystal slice 16.

In the above embodiment it will be assumed that the dispersion of crystal 16 is small enough to allow the variation in Brewster's angle with frequency to be disregarded for the frequencies of interest. Such an assumption is usually valid for the instant invention. The two radiation fields or beams 36 and 38 which are to be mixed must both be polarized in the plane of incidence, be incident at Brewster's angle to avoid reflection losses and have their electric field vectors directed along the [111] direction or equivalent inside crystal 16. The electric field generated at the sum or difference frequency will then have its maximum value, be parallel or antiparallel to the incident fields and reach the exit surface polarized in the plane of incidence and incident at the Brewster's angle and thus avoid reflection losses. The thickness, $t_s$, of slices 16 for sum frequency generation is given by:

$$t_s = \frac{m \lambda_1 \lambda_2}{2[\lambda_1(\eta_3 - \eta_2) + \lambda_2(\eta_3 - \eta_1)]}$$

while the thickness, $t_d$, of slices 16 for difference frequency generation is given by:

$$t_d = \frac{m \lambda_1 \lambda_2}{2[\lambda_1(\eta_2 - \eta_3) + \lambda_2(\eta_3 - \eta_1)]}$$

and wherein $m$ = an odd integer, $\lambda_1$ and $\lambda_2$ are the respective incident wavelengths, $\lambda_3$ is the generated wavelength and $\eta_1$, $\eta_2$ and $\eta_3$ are the index of refraction at wavelengths $\lambda_1$, $\lambda_2$ and $\lambda_3$, respectively.

Although this invention has been described with reference to particular embodiments it will be understood to those skilled in the art that this invention is also capable of a variety of further embodiments within the spirit and scope of the appended claims.

We claim:

1. An apparatus for producing second harmonic generation comprising a laser source for producing a laser beam at a preselected frequency, at least one crystal slice, said crystal slice having a preselected thickness and orientation, said orientation fulfilling the requirement that $P_{11} = \vec{P} \cdot \hat{E}$ be a maximum when said laser beam is incident at Brewster angle and wherein $\vec{P}$ = the non-linear polarization at twice the incident frequency, $\hat{E}$ = a unit vector along the component in the plane of incidence of the electric field vector of said laser beam and $P_{11}$ = the component of $\vec{P}$ parallel to $\hat{E}$, means for mounting said crystal slice in a preselected position and said preselected position being such that said crystal slice is in optical alignment with said laser beam and said laser beam is incident at Brewster angle.

2. An apparatus for producing second harmonic generation as defined in claim 1 wherein said crystal slice has a thickness equal to $\lambda/4 \Delta\eta(m)$ wherein $m$ is an odd integer, $\lambda$ is the wavelength of the incident radiation and $\Delta\eta = \eta(2\omega) - \eta(\omega)$ where $\eta(\omega)$ is the index of refraction of the incident radiation and $\eta(2\omega)$ is the index of refraction of the second harmonic generated radiation.

3. An apparatus for producing second harmonic generation as defined in claim 2 wherein said crystal slice is cut from a non-birefringent crystal.

4. An apparatus for producing second harmonic generation as defined in claim 3 comprising a plurality of crystal slices, said mounting means being capable of positioning said plurality of crystal slices in a preselected position and wherein every other crystal slice in said mounting means is rotated 180° about a line perpendicular to the plane of incidence with respect to their original position within said crystal.

5. An apparatus for producing second harmonic generation as defined in claim 4 wherein said mounting means is in the form of a holder having a plurality of slots therein for holding said crystal slices.

6. An apparatus for producing second harmonic generation as defined in claim 5 wherein said crystal is GaAs.

7. An apparatus for producing optical frequency mixing comprising a laser source for producing a laser beam at a preselected frequency, an optical source for producing a beam at another preselected frequency, means for combining said pair of beams, at least one crystal slice, said crystal slice having a preselected orientation, said orientation fulfilling the requirement that $P_{11} = \vec{P} \cdot \hat{E}$ be a maximum when said combined beams are incident at Brewster angle and wherein $\vec{P}$ = the nonlinear polarization at the sum or difference frequency of said pair of beams, $\hat{E}$ = a unit vector along the component in the plane of incidence of the electric field vectors of said combined beams and $P_{11}$ = the component of $\vec{P}$ parallel to $\hat{E}$, means for mounting said crystal slice in a preselected position and said preselected position being such that said crystal slice is in optical alignment with said combined beams and said combined beams are incident at Brewster angle.

8. An apparatus for producing optical frequency mixing as defined in claim 7 wherein said sum frequency is generated when said crystal slice has a thickness equal to $$\frac{m \lambda_1 \lambda_2}{2 [\lambda_1 (\eta_3 - \eta_2) + \lambda_2 (\eta_3 - \eta_1)]}$$

where $m$ is an odd integer, $\lambda_1$ and $\lambda_2$ are the incident wavelengths, respectively, $\lambda_3$ is the generated wavelength and $\eta_1$, $\eta_2$ and $\eta_3$ are the index of refractions at $\lambda_1$, $\lambda_2$ and $\lambda_3$, respectively.

9. An apparatus for producing optical frequency mixing as defined in claim 8 wherein said combined beams are coincident and parallel.

10. An apparatus for producing optical frequency mixing as defined in claim 9 wherein said crystal slice is cut from a non-birefringent crystal.

11. An apparatus for producing optical frequency mixing as defined in claim 10 comprising a plurality of crystal slices, said mounting means being capable of positioning said plurality of crystal slices in a preselected position and wherein every other crystal slice in said mounting means is rotated 180° about a line perpendicular to the plane of incidence with respect to their original position within said crystal.

12. An apparatus for producing optical frequency mixing as defined in claim 7 wherein said difference frequency is generated when said crystal slice has a thickness equal to $$\frac{m \lambda_1 \lambda_2}{2 [\lambda_1 (\eta_2 - \eta_3) + \lambda_2 (\eta_3 - \eta_1)]}$$

where $m$ is odd integer, $\lambda_1$ and $\lambda_2$ are the incident wavelenths, respectively, $\lambda_3$ is the generated wavelength and $\eta_1$, $\eta_2$ and $\eta_3$ are the index of refractions at $\lambda_1$, $\lambda_2$ and $\lambda_3$, respectively.

13. An apparatus for producing optical frequency mixing as defined in claim 12 wherein said combined beams are coincident and parallel.

14. An apparatus for producing optical frequency mixing as defined in claim 13 wherein said crystal slice is cut from a non-birefringent crystal.

15. An apparatus for producing optical frequency mixing as defined in claim 14 comprising a plurality of crystal slices, said mounting means being capable of positioning said plurality of crystal slices in a preselected position and wherein every other crystal slice in said mounting means is rotated 180° about a line perpendicular to the plane of incidence with respect to their original position within said crystal.

* * * * *

UNITED STATES PATENT OFFICE
CERTIFICATE OF CORRECTION

PATENT NO. : 4,016,427
DATED : 5 April 1977
INVENTOR(S) : Andrei Szilagyi et al

It is certified that error appears in the above-identified patent and that said Letters Patent are hereby corrected as shown below:

Column 3, line 53, "maxmimum" should read ---maximum---

Column 3, line 55, " $\hat{E}_1 = \hat{E}_2 = \hat{E}_3 = \frac{1}{\sqrt{3}}$ " should read --- $\hat{E}_1 = \hat{E}_2 = \hat{E}_3 = \frac{1}{\sqrt{3}}$ ---

Column 4, line 40, " $t_s = \frac{m \lambda_7 \lambda_2}{2[\lambda_1(n_3 - n_2) + \lambda_2(n_3 - n_1)]}$ "

should read --- $t_s = \frac{m \lambda_1 \lambda_2}{2[\lambda_1(n_3 - n_2) + \lambda_2(n_3 - n_1)]}$ ---

Column 6, lines 33 and 34 "wavelenths" should read ---wavelengths---

Signed and Sealed this

*Twenty-seventh* Day of *September 1977*

[SEAL]

Attest:

RUTH C. MASON
*Attesting Officer*

LUTRELLE F. PARKER
*Acting Commissioner of Patents and Trademarks*